Feb. 3, 1970     D. H. CAMPBELL     3,493,914
LINEAR MOTION POTENTIOMETER UNIT
Filed May 14, 1968     2 Sheets-Sheet 1

INVENTOR.
DUDLEY H. CAMPBELL
BY
Brown, Critchlow, Flick & Peckham
ATTORNEYS

INVENTOR.
DUDLEY H. CAMPBELL
BY
Brown, Critchlow, Flick & Peckham
ATTORNEYS

United States Patent Office 3,493,914
Patented Feb. 3, 1970

3,493,914
LINEAR MOTION POTENTIOMETER UNIT
Dudley H. Campbell, Raleigh, N.C., assignor to Stackpole Components Company, Raleigh, N.C., a corporation of Delaware
Filed May 14, 1968, Ser. No. 729,016
Int. Cl. H01c 5/02
U.S. Cl. 338—183  14 Claims

ABSTRACT OF THE DISCLOSURE

A potentiometer has an elongated housing with ends fitting in openings in a pair of thin metal mounting brackets. Each bracket at opposite sides of its opening presses tightly against the adjoining sides of the housing to rigidly mount the bracket on it. Each bracket also has one or more mounting tabs extending laterally away from the housing for insertion in one or more panel slots to attach the bracket to a panel.

---

It is among the objects of this invention to provide a linear motion potentiometer unit which can be quickly attached to one or two panels, which allows two or more potentiometers to be clamped together side by side for attachment to panels, and in which the clamping means can also serve to hold a two-part potentiometer housing together.

The invention is illustrated in the accompanying drawings, in which

Figure 1:
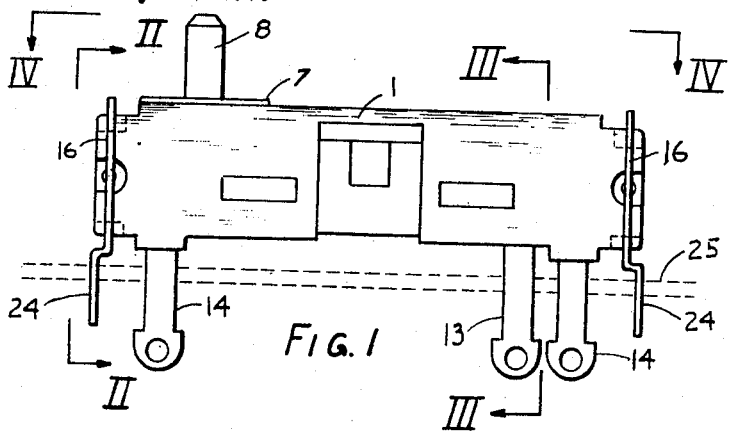
Figure 2:
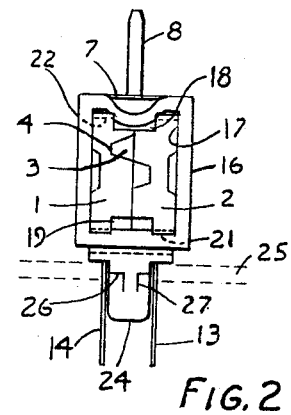
Figure 4:
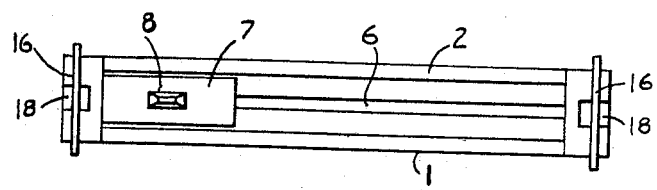
Figure 3:
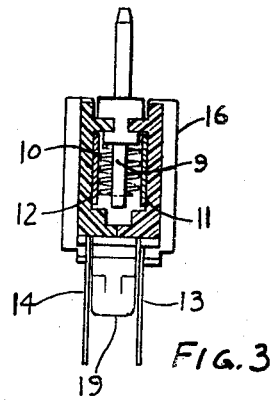
Figure 5:
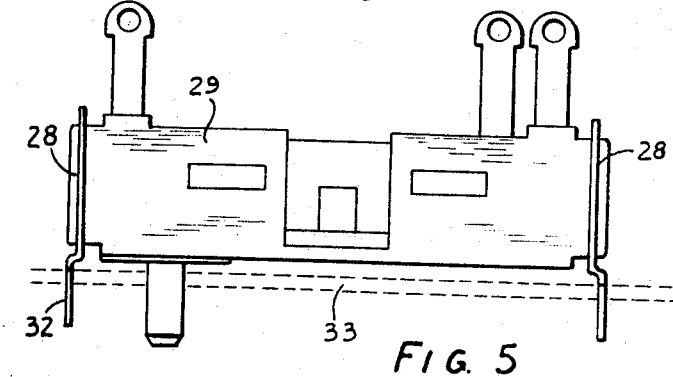
Figure 6:
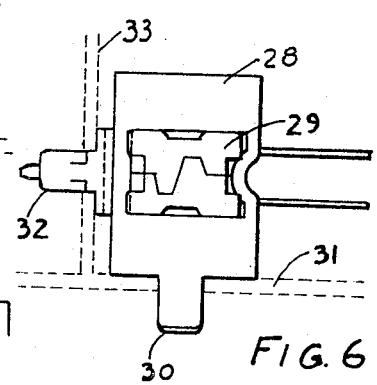
Figure 7:
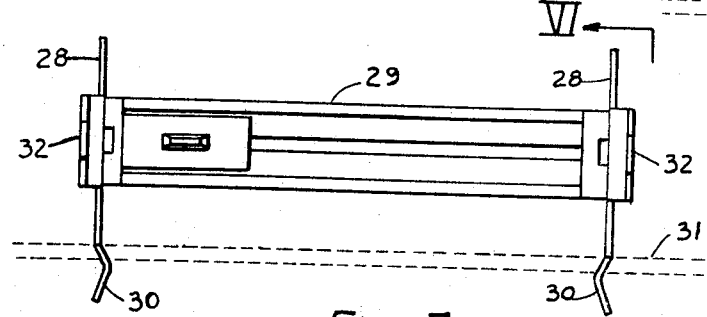
Figure 8:
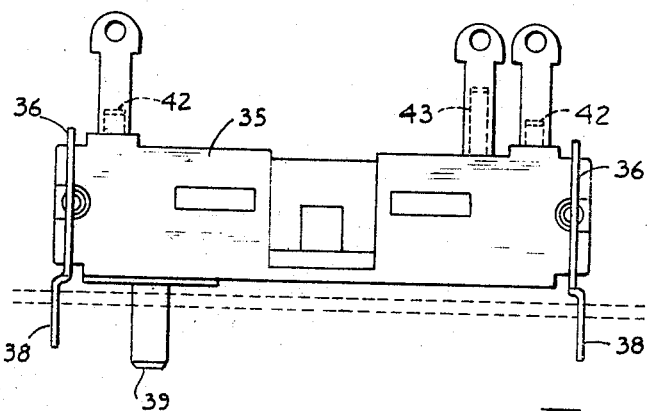
Figure 9:
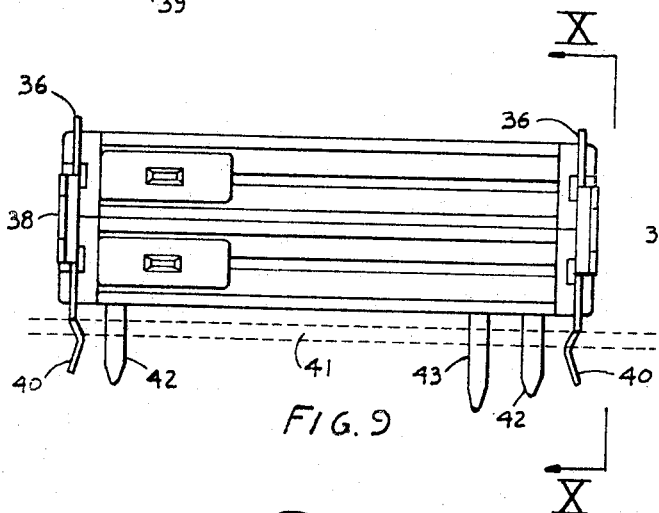
Figure 10:
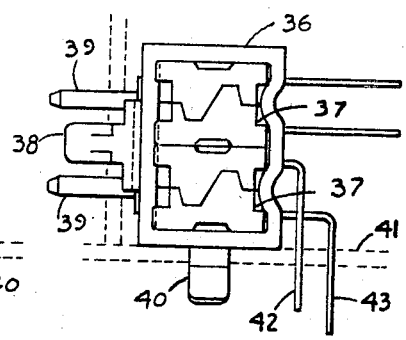
Figure 11:
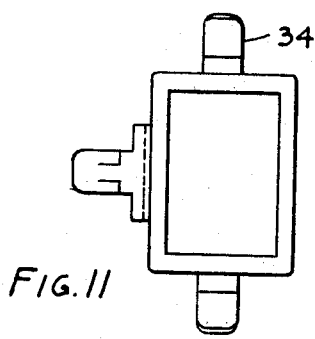
Figure 12:
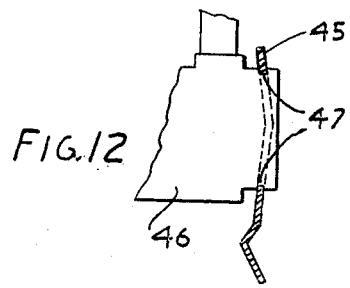

FIG. 1 is a side view of my potentiometer unit;
FIG. 2 is an end view;
FIG. 3 is a cross section taken on the line III—III of FIG. 1;
FIG. 4 is a plan view;
FIG. 5 is a plan view of a modification;
FIGS. 6 and 7 are end and side views, respectively, thereof;
FIG. 8 is a plan view of a stack of potentiometers;
FIG. 9 is a side view of the stack;
FIG. 10 is an end view thereof;
FIG. 11 is a side view of a modified mounting bracket; and
FIG. 12 is a fragmentary side view and section of a further embodiment.

Referring to FIGS. 1 to 4 of the drawings, a potentiometer of the general type shown in Patent 3,362,004, is illustrated. This potentiometer has an elongated housing molded from insulating material. Generally, but not necessarily, at least the ends of the housing will be rectangular and it will be formed from two half sections 1 and 2 that engage each other along a joint extending lengthwise along the bottom of the housing and up across its ends. The two halves of the housing may be provided at its bottom and ends with interengaging tongues 3 and notches 4 to properly align the two sections and prevent them from moving relative to each other in any direction in the plane of the joint.

The top side of the housing is provided with a longitudinal slot 6, in which a grooved slide 7 is slidably mounted. The slide has an upwardly projecting knob 8 for moving it along the slot. Inside the housing the slide carries a frame 9, in which a movable bridging contact 10 is mounted as shown in FIG. 3. Preferably, this contact is a coil of wire. It engages a metal collector strip 11 at one side of the housing and an electrical resistance strip 12 at the opposite side. The collector strip has a terminal 13 extending out of the bottom of the housing, and terminals 14 likewise extend out of the bottom of the housing from the opposite ends of the resistance strip.

It is a feature of this invention that a thin metal mounting bracket 16 is rigidly mounted on each end of the housing. The bracket can be formed in any desired way, such as by stamping it from sheet metal. Each bracket is provided with an opening 17 (FIG. 2) through it, which is the same shape as the ends of the potentiometer housing and in which the adjoining end of the housing fits tightly. The tight fit may be obtained in various ways, but preferably by pressing two opposite sides of the bracket toward each other to squeeze them against the housing. One side of the housing, such as the side containing longitudinal slot 6, may be provided inside each bracket with a recess 18 that opens toward the adjoining side of the bracket. The recess may also be open at the end of the housing. After the brackets have been applied to the ends of the housing, the portions of them beside the recesses are crushed to bend them into the recesses and thereby tightly against the opposite edges thereof. This is not only compresses the brackets against the top and bottom of the housing, but the bending of the brackets into the recesses draws the adjoining two sides of the bracket openings tightly against the adjoining sides of the housing, so the brackets are firmly attached to the housing. It is desirable to form recesses 19, like recesses 18, in the opposite side of the housing also, so that the brackets can be crushed from that side if they are reversed.

In addition to fitting tightly on the ends of the potentiometer, the brackets can be locked on by providing the side of the housing opposite recesses 18 with shallow transverse grooves 21 that receive the adjoining edges of the brackets. Each bracket is moved up into the adjoining grooves and held there while the top of the bracket is crushed or bent down into recess 18. The lock can be improved further by providing the top of the housing with similar grooves 22 beside recess 18. When the bracket is bent down into the recess it will enter the inner ends of these grooves.

If the two half sections of the potentiometer housing are not otherwise fastened together, such as by rivets or a clip, the brackets will serve the additional purpose of clamping the two sections together. This will eliminate rivets, screws or clips.

Each of the brackets is provided at one edge with an integral mounting tab 24 that extends away from the adjoining side of the housing. The tab shown in FIGS. 1 and 2 projects from the bottom of the housing so that the potentiometer can be mounted on a panel 25 below it. Although the tab may extend outwardly in the plane of the rest of the bracket, it is preferred to offset it toward the end face of the housing by providing the tab with a reverse bend or step. The steps will serve as stops when the tabs are inserted in slots in the supporting panel. The portions of the tabs that will project from the opposite side of the panel may be provided with the customary intersecting transverse and longitudinal slits 26 and 27 so that the tabs can be twisted easily in order to lock them in the panel. Of course, the terminals will also extend through openings in the panel. The brackets thus securely fasten the potentiometer to the panel.

If it is desired to mount a potentiometer on an upright panel with the slide knob extending forward through a slot in the panel, the twist tabs of the brackets will project from the slotted side of the housing instead of from the opposite side.

It may be desirable in some cases to mount the brackets in both an upright panel and a base panel. This can be done, as shown in FIGS. 5, 6 and 7, by providing the brackets 28, which are clamped on the ends of potentiometer 29, with downwardly projecting tabs 30 that can be inserted in slots in a horizontal panel 31. These can be twist tabs or tabs that can be bent over or, by bending the central portion of each of the bottom tabs laterally as shown in FIG. 7, they can be made to frictionally engage the side walls of the slots tightly. Since the twist tabs 32 and tabs 30 extend at right angles to each other, it is necessary to insert the friction tabs in the horizontal panel first and then move it and the potentiometer unit laterally to insert the twist tabs in the upright panel 33, or the twist tabs may be mounted in the upright panel first and then the assembly lowered to insert the friction tabs in the horizontal panel. If there is a possibility that the potentiometer unit may be used with a horizontal panel that may be either above or below it, then the brackets should be provided with upwardly extending mounting tabs 34 (FIG. 11) as well as downwardly extending tabs.

The brackets disclosed herein also have the advantage of being able to clamp two or more potentiometers 35 side by side in a row or stack, as shown in FIGS. 8, 9 and 10. The only change in the brackets 36 that is necessary is to make them large enough to accommodate openings in which all of the potentiometers can fit when stacked. When the side of a bracket that crosses the recesses 37 in the adjoining sides of the potentiometer housings is crushed to bend portions of the bracket into the recesses, the bracket is tightly secured to the housings. The twist tab may project from any side of a bracket except the crushed side, depending upon how the unit is to be mounted. In the drawings, the twist tabs 38 project from the front of the housings in the same direction as the slide knobs 39. The bottom of each bracket may be provided with another mounting tab 40 for insertion in a slot in a base panel 41. If this panel is a printed circuit board, some or all of the potentiometer terminals 42 and 43 can be bent downwardly in order to enter holes in the board when the unit is attached to it.

Another way to secure the brackets to the potentiometer is to make them of spring metal in such a way that they will grip it. As shown in FIG. 12, this can be done by bending the sides of a bracket 45 transversely to draw the upper and lower portions of the bracket closer together than the areas of the potentiometer housing 46 they are to engage. Then, in order to apply the bracket to the end of the housing, the bracket must be straightened or flattened to some extent to increase the height of the opening in it sufficiently to receive the housing. When the bracket is released, it will try to resume its more bent form and therefore will press tightly against the top and bottom of the housing. Here again, the connection can be improved by providing the top and bottom of the housing with shallow grooves 47 that receive the adjoining edges of the bracket and thereby lock the bracket in place.

It will be seen that the brackets disclosed herein are useful in holding a potentiometer housing together and securing it to one or more panels, and are especially useful when two or more potentiometers are disposed side by side, because the brackets clamp them together as well as provide means for fastening them to panels.

According to the provisions of the patents statutes, I have explained the principle of my invention and have illustrated and described what I now consider to represent its best embodiment. However, I desire to have it undersood that, within the scope of the appended claims, the invention may be practiced otherwise than as specifically illustrated and described.

I claim:

1. A linear motion potentiometer unit comprising an elongated potentiometer housing, resistor and collector elements inside the housing provided with electric terminals extending out of the housing, and a thin metal mounting bracket of substantially uniform thickness at each end of the housing, each bracket being provided with an opening therethrough receiving the adjoining end of the housing, said opening having a continuous side wall, the bracket at opposite sides of said opening pressing tightly against opposite sides of the housing to rigidly mount the bracket on the housing, the brackets being separated by the housing from said elements and each bracket having at an edge a mounting tab extending away from the adjoining side of the housing for insertion in a panel slot.

2. A linear motion potentiometer unit according to claim 1, in which each bracket is provided with a second mounting tab extending away from a side of the housing at an angle to said adjoining side.

3. A linear motion potentiometer unit according to claim 2, including a sliding contact actuator projecting from said adjoining side of the housing, said first-mentioned tab being a twist tab, and said second tab being a friction tab for insertion in a printed circuit panel slot.

4. A linear motion potentiometer unit according to claim 1, in which the ends of the housing are provided with transverse grooves receiving the brackets at at least one of said opposite sides of each of said bracket openings.

5. A linear motion potentiometer unit according to claim 1, in which each end of the housing is provided with transverse grooves receiving the adjoining bracket at said opposite sides of the bracket opening.

6. A linear motion potentiometer unit according to claim 1, in which a side of said housing is provided inside each bracket with an outwardly opening recess, and the adjoining side of the bracket is bent into said recess and presses tightly against its opposite edges.

7. A linear motion potentiometer unit according to claim 6, in which the housing is provided with transverse grooves beside each of said recesses, and with transverse grooves in the side opposite the recesses, and the brackets project into said grooves.

8. A linear motion potentiometer unit according to claim 1, in which each of the brackets is resilient with the portions thereof between said opposite sides bent to cause the bracket to grip the housing.

9. A linear motion potentiometer unit according to claim 1, in which sides of the housing beside said opposite sides of the bracket openings are provided inside the brackets with transverse grooves receiving adjoining portions of the brackets, and each of the brackets is resilient with the portions thereof in the grooves urged toward each other.

10. A linear motion potentiometer unit according to claim 1, in which sides of the housing beside said opposite sides of the bracket openings are provided inside the brackets with transverse grooves receiving adjoining portions of the brackets, and each of the brackets is resilient with the sides thereof between the adjoining grooves bent to draw the portions of the bracket in the grooves toward each other.

11. A linear motion potentiometer unit according to claim 1, including a plurality of said housings disposed side by side, with each of said brackets surrounding all of the housings to clamp them tightly together.

12. A linear motion potentiometer unit according to claim 11, in which said housings are provided inside each bracket with recesses beside the side of said opening farthest from said tab, and the bracket is bent into said recesses and presses tightly against their opposite edges.

13. A linear motion potentiometer unit according to claim 1, including a plurality of said housings disposed side by side, and a sliding contact actuator projecting from said adjoining side of each housing, each of said brackets surroundings all of the housings to clamp them tightly together and being provided with a mounting tab extending away from a side of the adjoining housing at an angle to said adjoining side for insertion in a printed circuit panel slot.

14. A linear motion potentiometer unit according to claim 13, in which the sides of the housings opposite said actuators are provided inside the brackets with recesses, and the brackets are bent into said recesses and press tightly against opposite edges thereof.

References Cited

UNITED STATES PATENTS

| | | | |
|---|---|---|---|
| 1,371,049 | 3/1921 | Oler | 338—197 XR |
| 1,620,693 | 3/1927 | Royal | 174—92 |
| 1,874,744 | 8/1932 | Hathorn | 338—332 XR |
| 2,023,517 | 12/1935 | Creager et al. | 338—332 XR |
| 3,059,153 | 10/1962 | Shaffer. | |
| 3,154,281 | 10/1964 | Frank. | |
| 3,362,004 | 1/1968 | Bang | 338—183 |

FOREIGN PATENTS

| | | |
|---|---|---|
| 922,823 | 2/1947 | France. |
| 724,614 | 9/1942 | Germany. |

THOMAS J. KOZMA, Primary Examiner

U.S. Cl. X.R.

338—184, 197